Patented Feb. 19, 1946

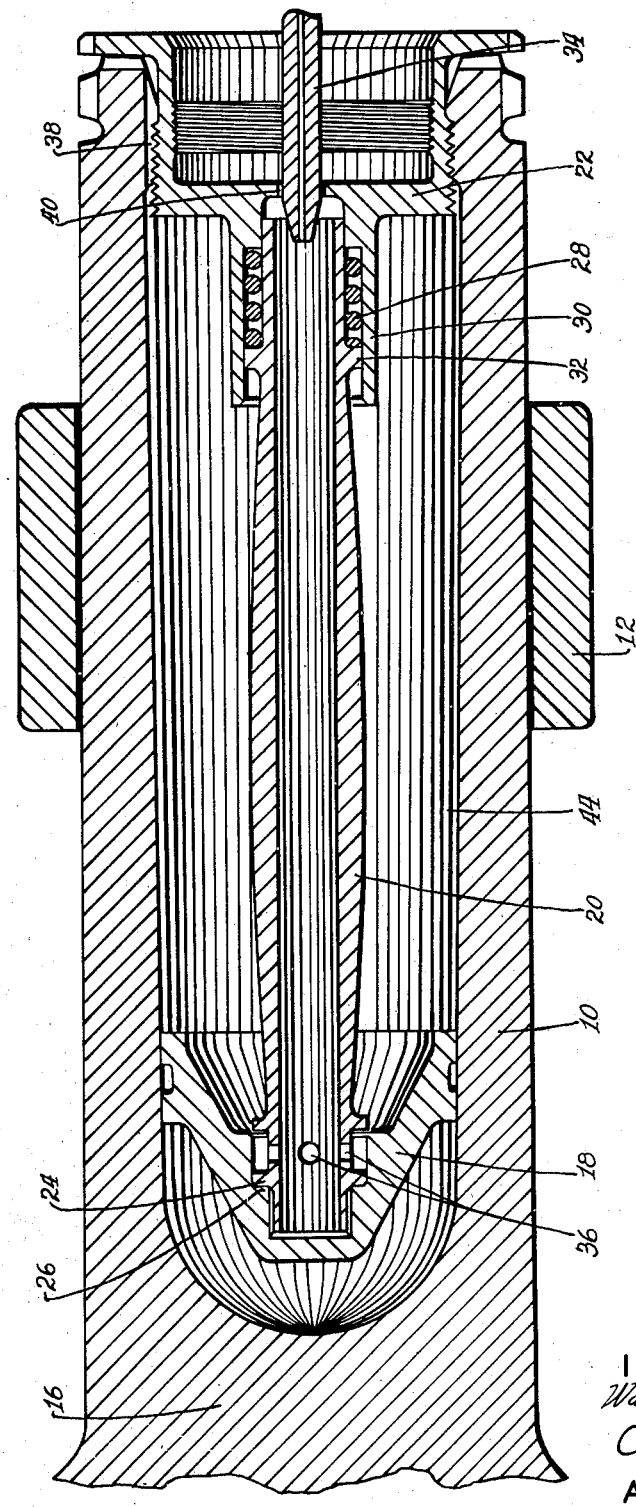

2,395,128

UNITED STATES PATENT OFFICE 2,395,128

TURBINE SHAFT COOLING

Walter A. Ledwith, Hartford, Conn., assignor to United Aircraft Corporation, East Hartford, Conn., a corporation of Delaware Application May 11, 1943, Serial No. 486,621

11 Claims. (Cl. 308—77)

This invention relates to the cooling of a turbine shaft.

In the co-pending application of Kalitinsky and Buck, Serial No. 486,609 filed May 11, 1943, the recess in the turbine shaft through which coolant is circulated is provided with a baffle which prevents the flow of fluid beyond a predetermined point in the shaft. A feature of the present invention is the mounting of this baffle within the shaft so that the baffle is wedged in place.

Another feature of this invention is the tapering of a part of the recess so that the baffle may be wedged in the recess by endwise pressure. Another feature is the use of a coolant tube extending from the open end of the recess to the baffle, and a spring urging the tube endwise against the baffle to hold the tube and baffle in place.

Other objects and advantages will be apparent from the specification and claims, and from the accompanying drawing which illustrates what is now considered to be a preferred embodiment of the invention.

The single figure is a sectional view through the cooling structure for the turbine shaft.

The turbine shaft 10 is journaled in a bearing 12 and has a recess 14 extending from the end of the shaft toward the power section 16. This power section becomes heated during operation of the turbine (especially in gas turbines) and the shaft conducts heat from the power section toward the bearing. The wall surfaces of recess 14 taper, at least adjacent the inner end, so that the walls diverge in a direction toward the outer end of the recess.

A cup-shaped baffle 18 extends across the recess adjacent the inner end and has an outer peripheral surface engaging the tapering walls of the recess and wedged in place by endwise pressure. A coolant tube 20 extends from a cap 22 at the outer end of the recess to the baffle. The inner end of the tube has a flange 24 engaging a shoulder 26 in the baffle. The outer end of the tube is supported radially by cap 22 and is free to move endwise. A spring 28 surrounding the tube and positioned in a sleeve 30 integral with the cap engages a flange 32 on the tube. This spring urges the tube and the baffle endwise and wedges the baffle securely within the recess. Coolant is directed into the outer end of the tube through a nozzle 34. Coolant discharges from the tube onto the surface of baffle 18 through radial openings 36 and escapes from recess 14 through one or more slots 38.

Nozzle 34 extends centrally through opening 40 in cap 22 which may be slightly larger in diameter than the nozzle. As this opening is smaller in diameter than tube 20, coolant collecting in the tube is caused to flow by centrifugal force toward the openings 36 at the inner end of the tube. Any surplus of coolant may escape through opening 40.

The coolant tube is not of uniform thickness and may be thicker in the center than at the ends, as shown, to control the critical speed of the tube for preventing vibration which might destroy the tube if its critical speed were approximately the operating speed of the shaft 10.

It is to be understood that the invention is not limited to the specific embodiment herein illustrated and described, but may be used in other ways without departure from its spirit as defined by the following claims.

I claim:

1. A shaft having a recess with a tapering wall, a baffle having a peripheral surface fitting said wall, and resilient means for holding said baffle in position.

2. A shaft having a recess with a tapering wall, a baffle having a peripheral surface fitting said wall, a tube engaging said baffle and resilient means acting on the tube to wedge the baffle in the recess.

3. A shaft having a recess with a tapering wall, a baffle having a peripheral surface fitting said wall, a tube extending axially of said recess and engaging said baffle, a cap at the end of the recess and a spring between said cap and tube for urging said tube and baffle endwise.

4. A shaft having a recess with a tapering wall, a baffle having a peripheral surface fitting said wall, a tube engaging said baffle and resilient means acting on the tube to wedge the baffle in the recess, said tube being thickened between its ends to control its critical speed.

5. A shaft having a recess with a tapering wall, a baffle having a peripheral surface fitting said wall, a tube engaging said baffle and resilient means acting on the tube to wedge the baffle in the recess, the wall thickness of said tube varying between its ends for controlling its critical speed.

6. A shaft having a recess with a tapering wall, a baffle having a peripheral surface fitting said wall, a tube extending axially of said recess with the inner end engaging and supported by the baffle, a cap at the end of the recess in which the outer end of the tube is slideably supported and a spring between said cap and tube for urging the tube and baffle endwise.

7. In shaft cooling, a shaft having a recess with a tapering wall portion, a baffle having a peripheral surface engaging said tapering wall portion, and a spring for wedging said baffle within the recess.

8. In shaft cooling, a shaft having a recess with a tapering wall portion, a baffle having a peripheral surface engaging said tapering wall portion, a coolant tube having its inner end engaging said baffle and resilient means acting on said tube to wedge the baffle in the recess.

9. In shaft cooling, a shaft having a recess with a tapering wall portion, a baffle having a peripheral surface engaging said tapering wall portion, a coolant tube having its inner end engaging said baffle, a cap at the end of the recess in which the tube is axially slideable, and a spring between said cap and tube for urging the tube and baffle endwise, said baffle and cap supporting the tube radially, and said cap hving a passage through which coolant is admitted to the tube.

10. A shaft having a recess, a baffle having a peripheral surface engaging the wall of the recess, and resilient means for holding said baffle in position.

11. A shaft having a recess, a baffle having a peripheral surface engaging the wall of the recess, a tube engaging said baffle, and resilient means acting on the tube to hold the baffle in position.

WALTER A. LEDWITH.